United States Patent [19]
Harada et al.

[11] Patent Number: 4,910,597
[45] Date of Patent: Mar. 20, 1990

[54] PHOTOELECTRIC CONVERTING APPARATUS ACCUMULATING A READOUT SIGNAL AND A REMAINING SIGNAL

[75] Inventors: Tadanori Harada, Tokorozawa; Seiji Hashimoto, Yokohama, both of Japan

[73] Assignee: Canon Kabushiki Kaisha, Tokyo, Japan

[21] Appl. No.: 226,385

[22] Filed: Aug. 1, 1988

[30] Foreign Application Priority Data

Aug. 5, 1987 [JP] Japan ................................ 62-194525
Mar. 28, 1988 [JP] Japan ................................ 63-72112

[51] Int. Cl.$^4$ ............................................. H04N 3/14
[52] U.S. Cl. ............................. 358/213.15; 358/213.18
[58] Field of Search .................... 358/213.15–213.18, 358/909, 163

[56] References Cited

U.S. PATENT DOCUMENTS

| | | | |
|---|---|---|---|
| 4,336,557 | 6/1982 | Koch | 358/213.15 |
| 4,380,755 | 4/1983 | Endlicher et al. | 382/68 |
| 4,589,025 | 5/1986 | Monahan et al. | 358/213.16 |
| 4,644,287 | 2/1987 | Levine | 358/213.15 |
| 4,797,561 | 1/1989 | Tajiri et al. | 358/213.15 |
| 4,802,012 | 1/1989 | Nobue et al. | 358/213.15 |

FOREIGN PATENT DOCUMENTS 60-12759 1/1985 Japan.

*Primary Examiner*—Jin F. Ng
*Assistant Examiner*—Stephen Brinich
*Attorney, Agent, or Firm*—Fitzpatrick, Cella, Harper & Scinto

[57] ABSTRACT

A photoelectric converting apparatus having an accumulating device to accumulate a signal from a photoelectric converting device. This apparatus includes a first accumulating portion to accumulate a readout signal of the photoelectric converting device; and a second accumulating portion to accumulate the remaining signal after the photoelectric converting device was refreshed, wherein the signals of the first and second accumulating portions are superposed and output, thereby obtaining an output signal in which the remaining signal is eliminated from the readout signal.

16 Claims, 13 Drawing Sheets

PHOTOELECTRIC CONVERTING APPARATUS ACCUMULATING A READOUT SIGNAL AND A REMAINING SIGNAL

FIELD OF THE INVENTION

The present invention relates to a photoelectric converting apparatus having accumulating means for accumulating a signal from a photoelectric converting device and, more particularly, to a photoelectric converting apparatus which eliminates a variation in dark signal and eliminates unnecessary components such as drive noises and the like.

RELATED BACKGROUND ART

FIG. 1 is a schematic arrangement diagram showing an example of a conventional photoelectric converting apparatus.

In the diagram, readout signals from photo sensors $S_1$ to $S_n$ are accumulated in accumulating capacitors $C_1$ to $C_n$. When transistors $Q_{h1}$ to $Q_{hn}$ are sequentially turned on in accordance with an operating timing of a scan circuit 101, the readout signals are successively transmitted onto an output line 102 and are output to the outside through an amplifier 103.

However, such a conventional apparatus has the problem that unnecessary components such as dark signals, drive noises, and the like of the photo sensors are included in the readout signal and the readout signal is output in this state. The drive noises are the noises which are generated when the signals are read out by driving the photo sensors. The drive noises denote the noises which are caused due to a variation in the shape of the device or the like upon manufacturing and the smears or the like which depend on an amount of light irradiation due to the separation of the device or the like.

On the other hand, the dark signal denotes the dark current of the photo sensor. A variation in the dark signal largely depends on the accumulating time of the photo sensor and the temperature.

Those unnecessary signals such as drive noises, dark signals, and the like cause a problem particularly when an image is picked up under the condition of a low illuminance. In the low-illuminance image pickup mode, the information signal level by the image pickup operation decreases, so that the S/N ratio is eventually reduced and the picture quality deteriorates. Therefore, in order to improve the picture quality, those unnecessary signals need to be reduced.

However, as mentioned above, since the dark signals largely depend on the temperature and accumulating time, and the drive noises hardly depend on them, in order to remove these unnecessary signals, it is necessary to separate both of these signals and to independently determine correction coefficients there for. For this purpose, a number of memories are needed. Consequently, signal processing is complicated, costs are increased, and the size of the image pickup apparatus increases.

SUMMARY OF THE INVENTION

The applicant of this invention has already proposed an apparatus which can improve the foregoing drawbacks in Japanese Patent Application No. 61-229625 or the like. It is an object of the present invention to provide a further improved apparatus of this prior art apparatus.

To accomplish this object, according to the first embodiment of the present invention, there is provided a photoelectric converting apparatus having accumulating means for accumulating a signal from a photoelectric converting device, and this apparatus comprises: first accumulating means for accumulating a readout signal of the photoelectric converting device; and second accumulating means for accumulating a remaining signal after the photoelectric converting device is refreshed, wherein the connecting state of the first and second accumulating means is controlled, thereby obtaining an output signal in which the remaining signal is removed from the readout signal.

In this manner, the remaining signal after the refreshing operation is removed from the readout signal by controlling the connecting state of the accumulating means, so that the unnecessary components such as dark signal, drive noises, and the like of the photoelectric converting device can be eliminated from the readout signal.

According to the second embodiment of the invention, there is provided a photoelectric converting apparatus in which first reset means and first and second accumulating means are connected to an output terminal of a photoelectric converting device, signal transfer means and second reset means are further connected to this output terminal through the second accumulating means, the second accumulating means is set to a reference potential by the second reset means when a first signal is read out of the photoelectric converting device, and the second accumulating means is set into a floating state by the second reset means when a second signal is read out of the photoelectric converting device.

In this manner, by accumulating the first and second signals from the photoelectric converting device in the first and second accumulating means, the first and second signals can be superposed and read out, so that the unnecessary components such as noises and the like can be removed from a photoelectric conversion output.

The above and other objects and features of the present invention will become apparent from the following detailed description and the appended claim with reference to the accompanying drawings.

DETAILED DESCRIPTION OF THE PREFERRED EMBODIMENTS

Figure 1:
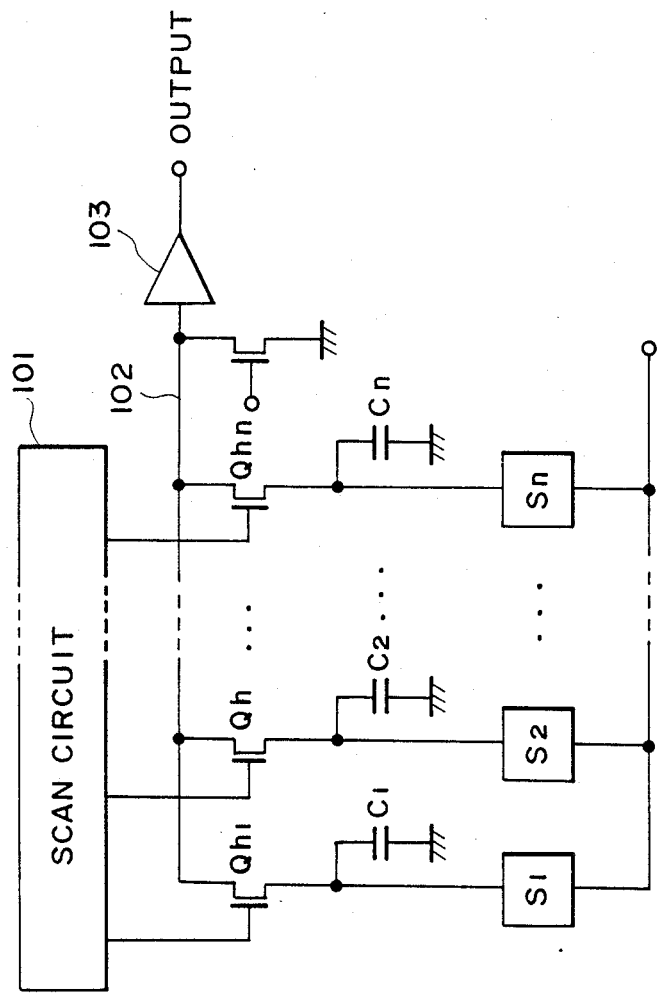
FIG. 1 is a schematic arrangement diagram showing an example of a conventional photoelectric converting apparatus.
Figure 2A:
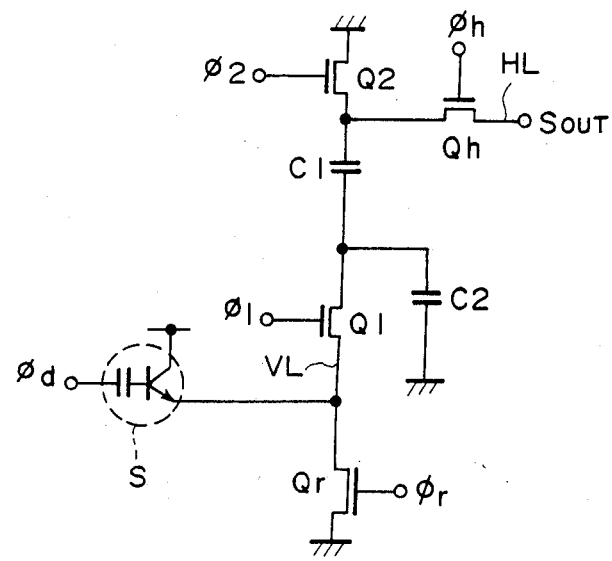
FIG. 2A is a circuit diagram for explaining a fundamental arrangement of the first embodiment of a photoelectric converting apparatus according to the present invention.

FIG. 2A is a circuit diagram for explaining a fundamental arrangement of the first embodiment of a photoelectric converting apparatus according to the present invention.

In FIG. 2A, an emitter electrode of a photoelectric converting cell S is connected to a vertical line VL and grounded through a transistor $Q_r$. The vertical line VL is connected to the accumulating capacitors $C_1$ and $C_2$ through the transistor $Q_1$. The capacitor $C_1$ is further grounded through the transistor $Q_2$. A horizontal output line HL is connected through a transistor $Q_h$ to a node of the capacitor $C_1$ and transistor $Q_2$.

On one hand, a pulse $\phi_1$ is applied to a gate electrode of the transistor $Q_1$. A pulse $\phi_2$ is applied to a gate electrode of the transistor $Q_2$. A pulse $\phi_r$ is further applied to a gate electrode of the transistor $Q_r$. A pulse $\phi_d$ to read out and to refresh drive is applied to a capacitor electrode of the photoelectric converting cell S. On the other hand, a pulse $\phi_h$ is applied to a gate electrode of the transistor $Q_h$.

Since the photoelectric converting cell S has been described in detail in Japanese Laid-Open Patent Gazette No. 60-12759, which has already been filed by the applicant of the present invention, its description is omitted here.

The operation of this embodiment of the apparatus of the present invention will now be described.

Figure 2B:
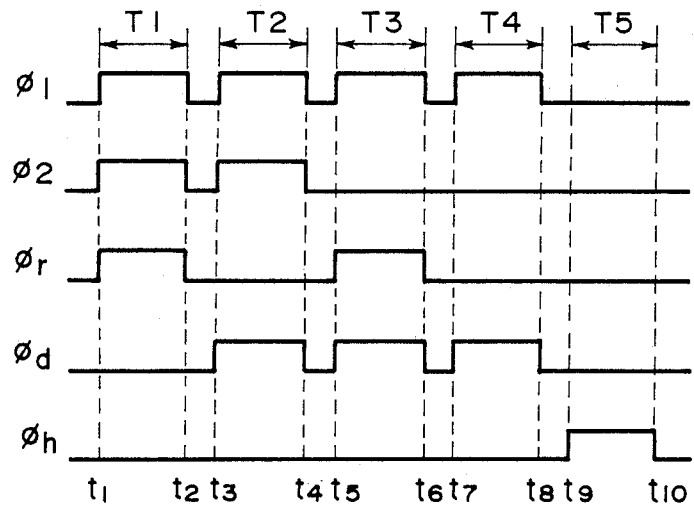
FIG. 2B is a timing chart for explaining the operation of the circuit shown in FIG. 2A.

FIG. 2B is a timing chart for explaining the operation of the circuit shown in FIG. 2A.

First, the transistors $Q_1$, $Q_2$, and $Q_r$ are first turned on by setting the pulses $\phi_1$, $\phi_2$, and $\phi_r$ to the high level for a time interval from $t_1$ to $t_2$, thereby clearing the capacitors $C_1$ and $C_2$ (for a period of time $T_1$)

Next, the transistors $Q_1$ and $Q_2$ are turned on by setting the pulses $\phi_1$ and $\phi_2$ to the high level for a time interval from $t_3$ to $t_4$ and at the same time, a high level pulse $\phi_d$ is applied to the capacitor electrode of the photoelectric converting cell S, so that a signal accumulated in the cell S is read out and accumulated in the capacitors $C_1$ and $C_2$ (for a period of time $T_2$).

Subsequently, the transistors $Q_1$ and $Q_r$ are turned on by setting the pulses $\phi_1$ and $\phi_r$ to the high level for a time interval from $t_5$ to $t_6$, the capacitor $C_2$ is cleared, and the pulse $\phi_d$ which is held at the high level for this period of time is applied to the capacitor electrode of the cell S, so that the refreshing operation of the cell S is executed (for a period of time $T_3$).

After completion of the refreshing operation, the transistor $Q_1$ is turned on by the high level pulse $\phi_1$ for a time interval from $t_7$ to $t_8$ and at the same time, the high level pulse $\phi_d$ is applied to the capacitor electrode of the cell S, so that the remaining signal after the cell S was refreshed is accumulated in the capacitor $C_2$ (for a period of time $T_4$).

After both of the readout signal and the remaining signal after completion of the refreshing operation of the cell S are respectively accumulated in the capacitors $C_1$ and $C_2$, the transistor $Q_h$ is turned on by the high level pulse $\phi_h$ for a subsequent time interval from $t_9$ to $t_{10}$, thereby allowing the charges accumulated in a series circuit of the capacitors $C_1$ and $C_2$ to be output to the horizontal output line HL (for a period of time $T_5$).

FIG. 3 is a diagram showing the charge accumulating states of the capacitors $C_1$ and $C_2$ at that time. A switch SW denotes the transistor $Q_h$. The capacitor $C_3$ denotes a line capacitance of the output line HL.

Figure 3A:
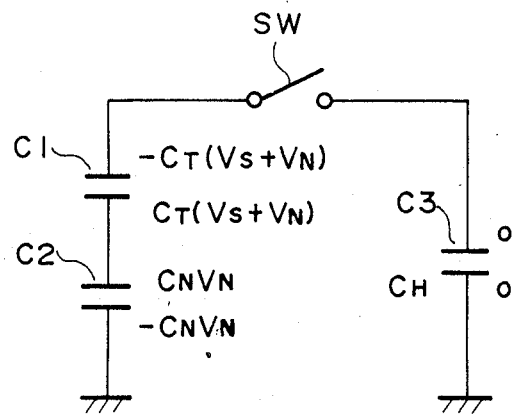
FIGS. 3A and 3B are connecting diagrams of capacitors for explaining the operation of the circuit shown in FIG. 2A.

FIG. 3A shows a state just after the period $T_4$. The charges of $-C_T(V_S+V_N)$ and $C_T(V_S+V_N)$ are accumulated at both ends of the capacitor $C_1$, respectively. The charges of $C_N V_N$ and $-C_N V_N$ are accumulated at both ends of the capacitor $C_2$, respectively. The capacitor $C_3$ is cleared. $C_T$, $C_N$, and $C_H$ denote capacitances of the capacitors $C_1$, $C_2$, and $C_3$. $V_S$ and $V_N$ indicate voltages of the information signal read out of the photoelectric converting cell S and of the unnecessary signal.

Figure 3B:
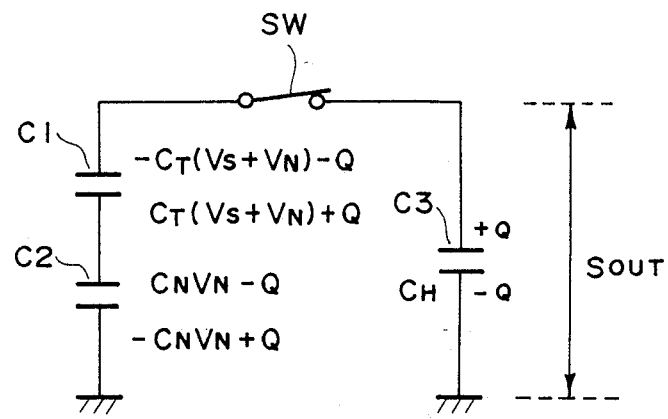

FIG. 3B shows a state in the period $T_5$. Assuming that an amount of charges accumulated in the capacitor $C_3$ is set to Q, the following voltage equation is satisfied.

$$\frac{C_N V_N - Q}{C_N} + \frac{-C_T V_S - C_T V_N - Q}{C_T} + \frac{-Q}{C_H} = 0$$

Therefore, $$V_N - V_S - V_N - Q\left(\frac{1}{C_N} + \frac{1}{C_T} + \frac{1}{C_H}\right) = 0$$

Now, Assuming that $$\frac{1}{C_{TOT}} = \frac{1}{C_N} + \frac{1}{C_T} + \frac{1}{C_H}$$

we have $$-V_S = Q \frac{1}{C_{TOT}}$$

Thus, $$Q = -C_{TOT} V_S$$

Therefore, a voltage across the capacitor $C_3$, that is, an output signal $S_{out}$ appearing on the output line HL is obtained by $$S_{out} = \frac{Q}{C_H} = -V_S \frac{C_{TOT}}{C_H} \quad (1)$$

Consequently, it will be understood that the output signal $S_{out}$ consists of only the information signal in which the unnecessary signal was removed from the readout signal of the cell S.

As explained above, the signal $S_{out}$ is the signal from which the unnecessary components such as dark signal and drive noises and the remaining components were eliminated. The signal $S_{out}$ accurately corresponds to the illuminance of the incident light. In particular, the unnecessary components on the low illuminance side are effectively removed and this embodiment contributes to the improvement of the picture quality.

Figure 4:
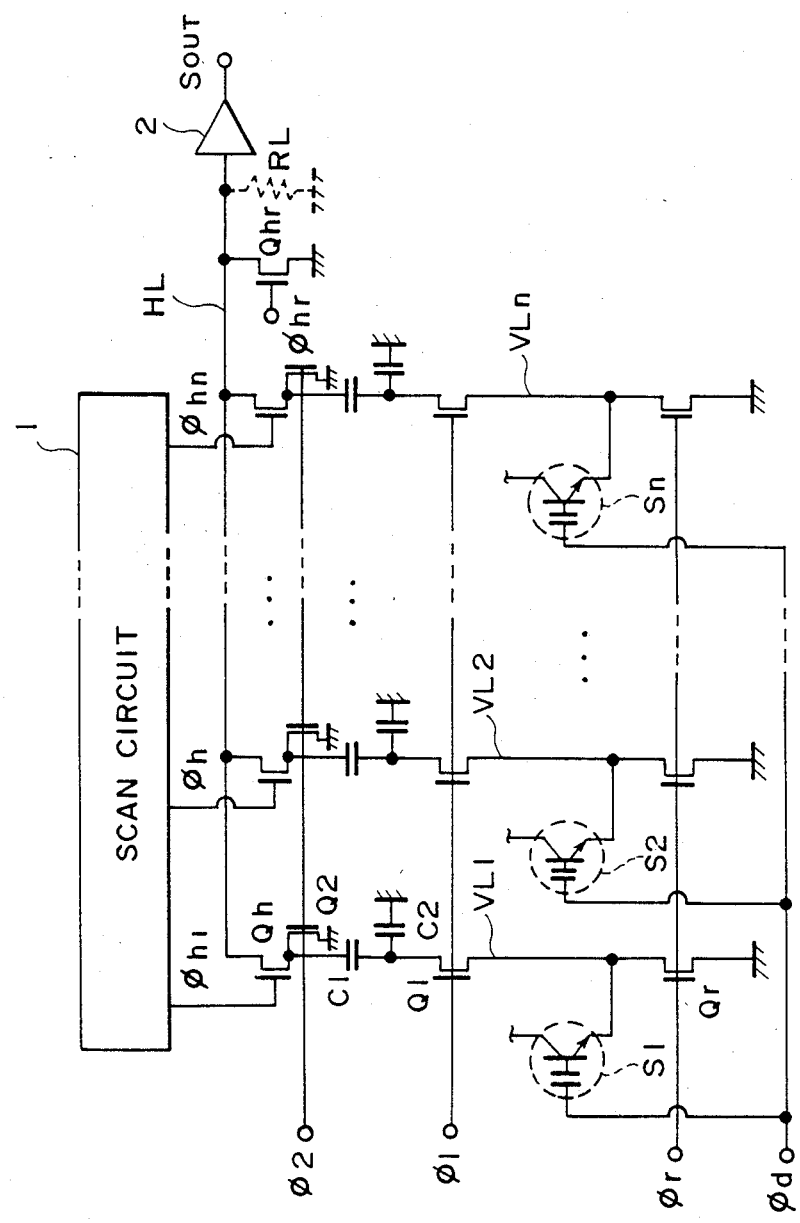
FIG. 4 is a circuit diagram of the embodiment.

FIG. 4 is a circuit diagram of a line sensor using the embodiment.

This embodiment is constructed by arranging n circuits shown in FIG. 2A.

In the diagram, emitter electrodes of photoelectric converting cells $S_1$ to $S_n$ are respectively connected to vertical lines $VL_1$ to $VL_n$. The circuit similar to that shown in FIG. 2A is connected to each of these vertical lines. Gate electrodes of the transistors $Q_r$ of the vertical lines are commonly connected and the pulse $\phi_r$ is applied to these gate electrodes. On the other hand, the gate electrodes of the transistors $Q_1$ are also commonly connected and the pulse $\phi_1$ is applied to these gate electrodes. The gate electrodes of the transistors $Q_2$ are also commonly connected and the pulse $\phi_2$ is applied to these gate electrodes.

Gate electrodes of the transistors $Q_h$ corresponding to the photoelectric converting cells are together connected to parallel output terminals of a scan circuit 1 and pulses $\phi_{h1}$ to $\phi_{hn}$ are applied to the corresponding gate electrodes. On the other hand, the transistors $Q_h$ are connected to the output line HL. The output line HL is connected to an amplifier 2 and is also grounded through a transistor $Q_{hr}$. A reset pulse $\phi_{hr}$ is applied to a gate electrode of the transistor $Q_{hr}$.

The operation of the embodiment having the foregoing construction will now be briefly described with reference to FIG. 5.

Figure 5:
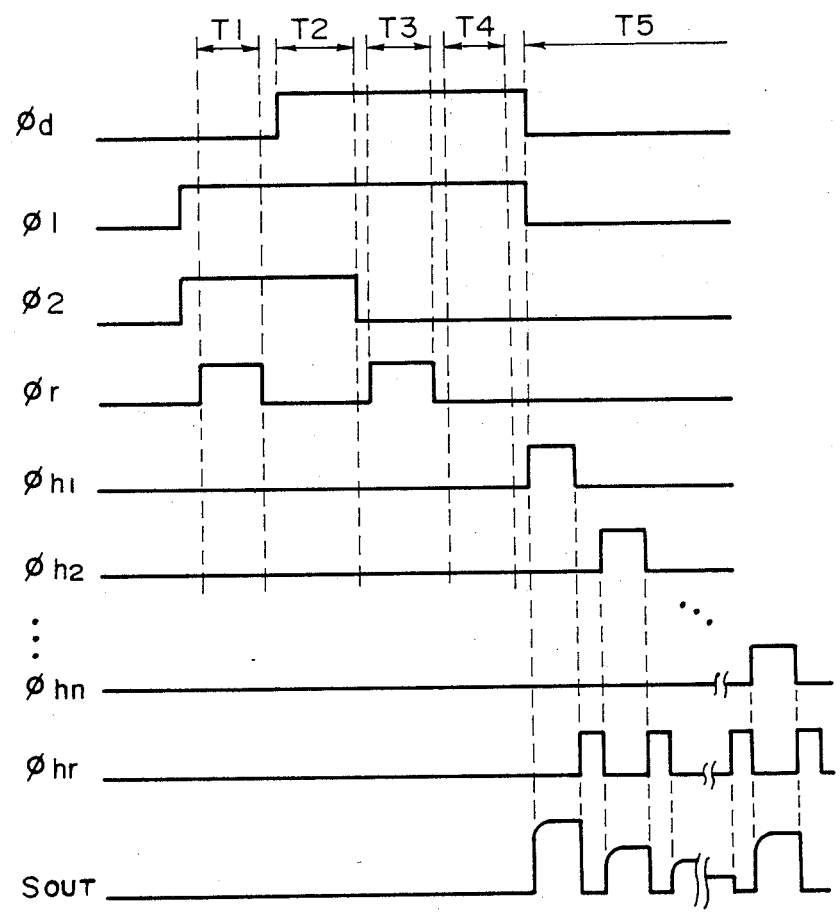
FIG. 5 is a timing chart for explaining the operation of the embodiment.

FIG. 5 is a timing chart for explaining the operation of the embodiment.

As already described above, the capacitors $C_1$ and $C_2$ corresponding to the photoelectric converting cells are cleared for the period $T_1$ and the readout signals of these cells are accumulated in the capacitors $C_1$ and $C_2$ for the period $T_2$. Subsequently, the capacitor $C_2$ is cleared and each photoelectric converting cell is refreshed for the period $T_3$. The remaining signal of each cell after it was refreshed is accumulated in the capacitor $C_2$ for the period $T_4$.

After the readout signal and remaining signal of each photoelectric converting cell were accumulated, the pulse $\phi_{h1}$ is applied from the scan circuit 1 to the gate electrode of the transistor $Q_h$ for the period $T_5$. As mentioned above, the signal obtained by removing the remaining signal accumulated in the capacitor $C_2$ from the readout signal of the photoelectric converting cell $S_1$ accumulated in the capacitor $C_1$ is transferred as an information signal onto the output line HL in accordance with the connecting state of the capacitors $C_1$ and $C_2$. This information signal is transmitted through the amplifier 2 and generated as the output signal $S_{out}$.

After the signal of the cell $S_1$ has been output, the transistor $Q_{hr}$ is turned on by the pulse $\phi_{hr}$ and the charges remaining on the output line HL are eliminated.

In a manner similar to the above, the information signals of the photoelectric converting cells $S_2$ to $S_n$ are transferred to the output line HL by the pulses $\phi_{h2}$ to $\phi_{hn}$ and are sequentially output as the signals $S_{out}$ through the amplifier 2.

Although the embodiment has been described with respect to a voltage readout system, the invention can be also similarly applied to the case of a current readout system in which a load resistor RL is also connected to the output line HL as shown by a broken line in FIG. 4.

On the other hand, although the embodiment has been described with regard to a one-dimensional line sensor, the invention can be also obviously applied to a two-dimensional area sensor.

As described in detail above, according to the photoelectric converting apparatus of the invention, the photoelectric conversion signal of a high S/N ratio can be obtained on-chip by using a simple method whereby the unnecessary components such as dark signal, drive noises, and the like of the photoelectric converting device are removed from the readout signals due to the connecting relation between the first capacitor to accumulate the readout signals of the photoelectric converting cells and the second capacitor to accumulate the remaining signals after completion of the refreshing operation.

Figure 6:
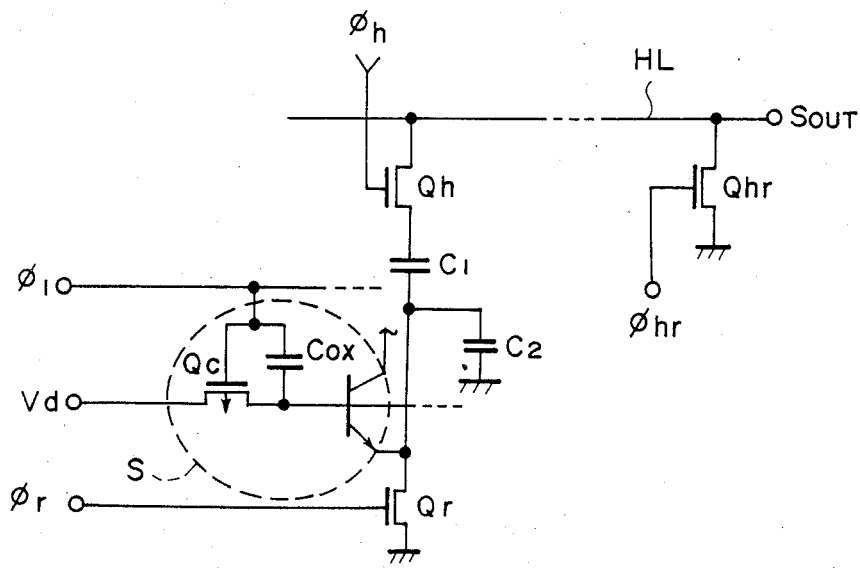
FIG. 6 is a schematic circuit diagram showing a fundamental arrangement of the second embodiment of a photoelectric converting apparatus according to the invention.

FIG. 6 is a schematic circuit diagram showing a fundamental arrangement of the second embodiment of a photoelectric converting apparatus according to the invention.

In the diagram, the emitter electrode of the transistor connected to an output terminal of the photo sensor cell S is grounded through the transistor $Q_r$. The pulse $\phi_r$ is input to the gate electrode of the transistor $Q_r$. Further, the emitter electrode is grounded through the capacitor $C_2$ and is also connected to the horizontal output line HL through the capacitor $C_1$ and transistor $Q_h$. Although not shown, the horizontal scan pulse $\phi_h$ is input from a shift register (not shown) to the gate electrode of the transistor $Q_h$.

The horizontal output line HL is grounded through the reset transistor $Q_{hr}$. The pulse $\phi_{hr}$ is input to a gate electrode of the transistor $Q_{hr}$.

Figure 7:
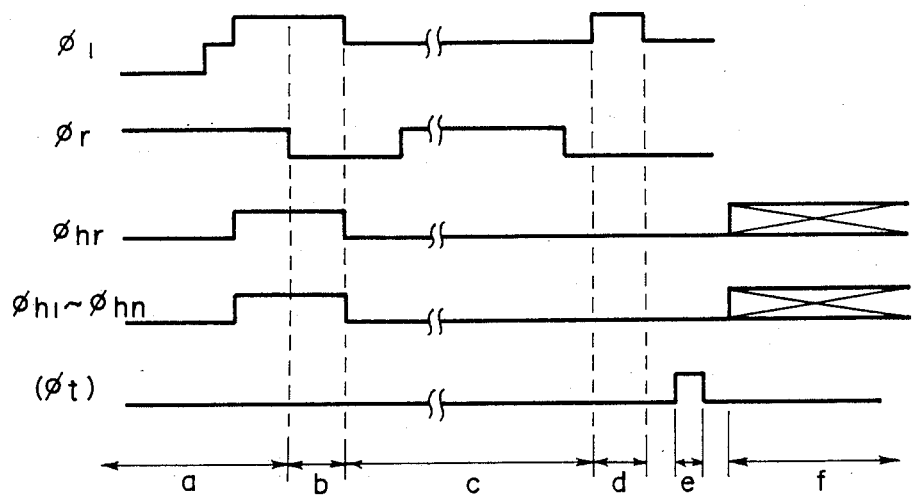
FIGS. 7 and 8 are timing charts showing the first and second examples of the practical operations of the photoelectric converting apparatuses in the second and third embodiments of the present inventions.
Figure 8:
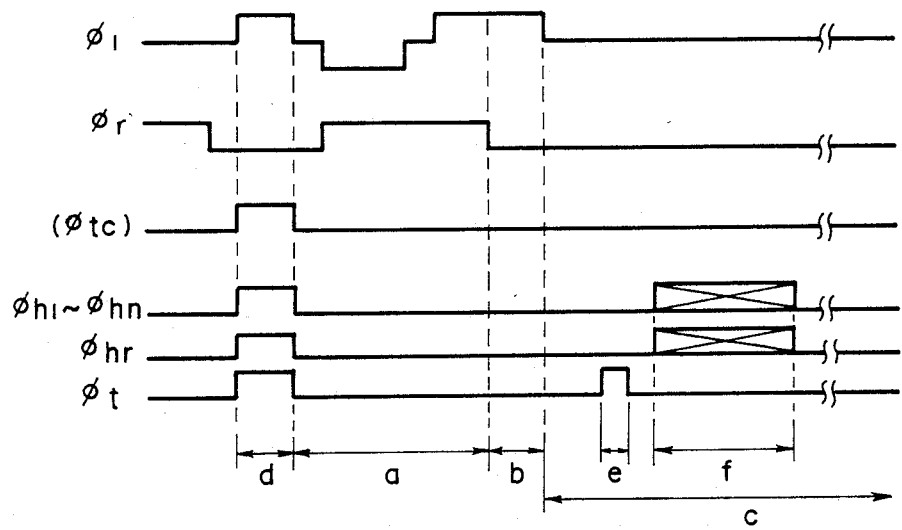

FIGS. 7 and 8 are timing charts showing the first and second examples of the practical operations of the photoelectric converting apparatuses in the second and third embodiments according to the invention.

The first example shown in FIG. 7 relates to the example of the operation to first read out the noises and then read out the signal. The second example shown in FIG. 8 relates to the example of the operation to first read out the signal and then read out the noises.

In FIG. 7, the photo sensor S is refreshed and the pulse $\phi_{hr}$ and all of the scan pulses $\phi_{h1}$ to $\phi_{hn}$ are set to the high level for a period a, thereby clearing all of the capacitors $C_1$.

Subsequently, the pulses $\phi_{hr}$ and $\phi_{h1}$ to $\phi_{hn}$ are held and the capacitor $C_1$ is grounded through the transistors $Q_h$ and $Q_{hr}$. The pulse $\phi_r$ is set to the low level, thereby setting the emitter of the photo sensor S into the floating state. Thus, the noise components after the photo sensor S was refreshed are transferred and accumulated into the capacitors $C_2$ and $C_1$ (for a period of time b). Then, the drive pulse $\phi_1$ trails to a reference potential and the photo sensor S starts the accumulating operation (for a period of time c). For this accumulating period c, the pulse $\phi_r$ is set to the high level and the capacitor $C_2$ is cleared.

Subsequently, after completion of the accumulating period c, the pulse $\phi_1$ is set to the high level and the sensor signal corresponding to the incident light amount is read out and transferred and accumulated to the capacitor $C_2$ (for a period of time d). At this time, since the pulses $\phi_{hl}$ to $\phi_{hn}$ and $\phi_{hr}$ are at the low level, the transistors $Q_h$ and $O_{hr}$ are turned off and the capacitor $C_1$ is in the floating state.

Next, the horizontal scan pulses $\phi_{hl}$ to $\phi_{hn}$ are sequentially set to the high level. The signals $S_{out}$ in which the noise components were removed from the sensor signals are sequentially output from the horizontal output line HL to the outside. In this case, each time the signal of one pixel is output, the transistor $Q_{hr}$ is turned on by the pulse $\phi_{hr}$ and the remaining charges on the horizontal output line HL are cleared (for a signal readout period of time f).

Figure 9:
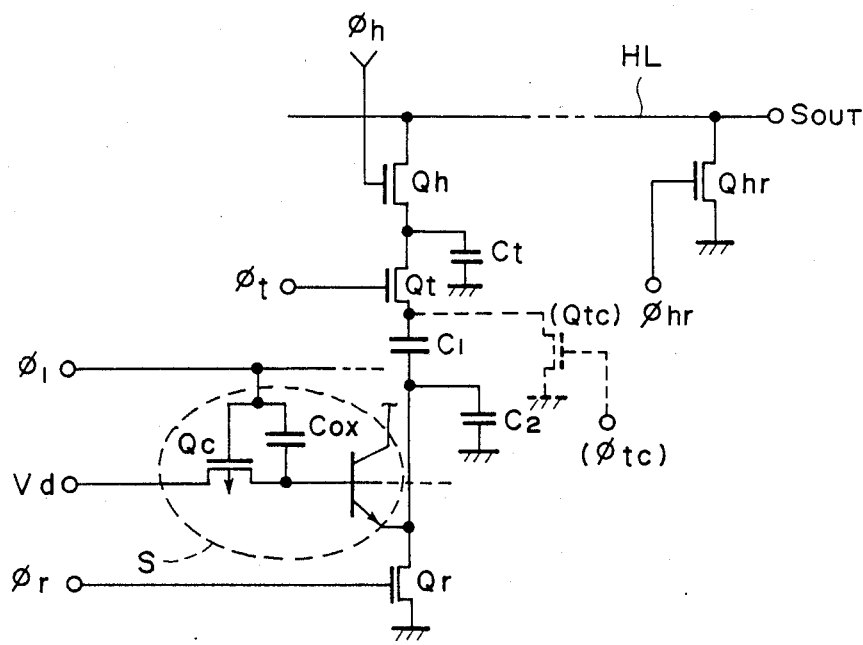
FIG. 9 is a schematic circuit diagram showing a fundamental arrangement of the third embodiment of the invention.

FIG. 9 is a schematic circuit diagram showing a fundamental arrangement of the third embodiment of the invention.

In this embodiment, a transfer transistor $Q_t$ and a capacitor $C_t$ are provided between the capacitor $C_1$ and transistor $Q_h$ in the second embodiment, and prior to horizontally scanning, the signal from which the noise components were removed is accumulated in the capacitor $C_t$.

The case where the circuit of the third embodiment is operated on the basis of the second operation example shown in FIG. 8 will be described.

First, after completion of the accumulating period of time c, the pulses $\phi_{hl}$ to $\phi_{hn}$, $\phi_{hr}$, and $\phi_t$ are set to the high level and the capacitor $C_t$ is cleared and at the same time, the other end of the capacitor $C_1$ is grounded. The pulse $\phi_1$ is set to the high level, and the sensor signal from the photo sensor cell S is read out and accumulated in the capacitors $C_2$ and $C_1$ (for the signal transfer period of time d).

Next, by setting the pulse $\phi_r$ to the high level, the transistor $Q_r$ is turned on, the emitter of the photo sensor cell S is grounded, the refreshing operation is performed, and the capacitor $C_2$ is cleared (for the period of time a).

Next, the pulse $\phi_1$ is held at the high level and the pulse $\phi_r$ is set to the low level to turn off the transistor $Q_r$, and the noise components of the photo sensor S are transferred to the capacitor $C_2$ (for the period b). The photo sensor S starts the accumulating operation (for the period c).

On the other hand, when the transistor $Q_t$ is turned on by setting the pulse $\phi_t$ to the high level, the signal from which the noise components were removed is transferred and accumulated in the capacitor $C_t$ (for the period e). The signals are successively transferred to the horizontal output line HL by the horizontal scan pulses $\phi_{hl}$ to $\phi_{hn}$ and $\phi_{hr}$ and output to the outside (for the period f).

As mentioned above, since the emitter of the photo sensor S is directly connected to the capacitors $C_1$ and $C_2$ in the second and third embodiments, the load capacitance of the photo sensor S can be lightened and the reading efficiency can be improved.

In addition, since a fluctuation of a voltage $V_b$ of the transistor due to variations in temperature, manufacturing, and the like is also simultaneously eliminated together with the removal of the noises, even if the read-out signal is amplified by the amplifier arranged at the post stage, a signal of a high S/N ratio can be obtained.

The circuit of the second embodiment shown in FIG. 6 can be also operated on the basis of the second operation example shown in FIG. 8. The circuit of the third embodiment can be also operated on the basis of the first operation example shown in FIG. 7.

Figure 10:
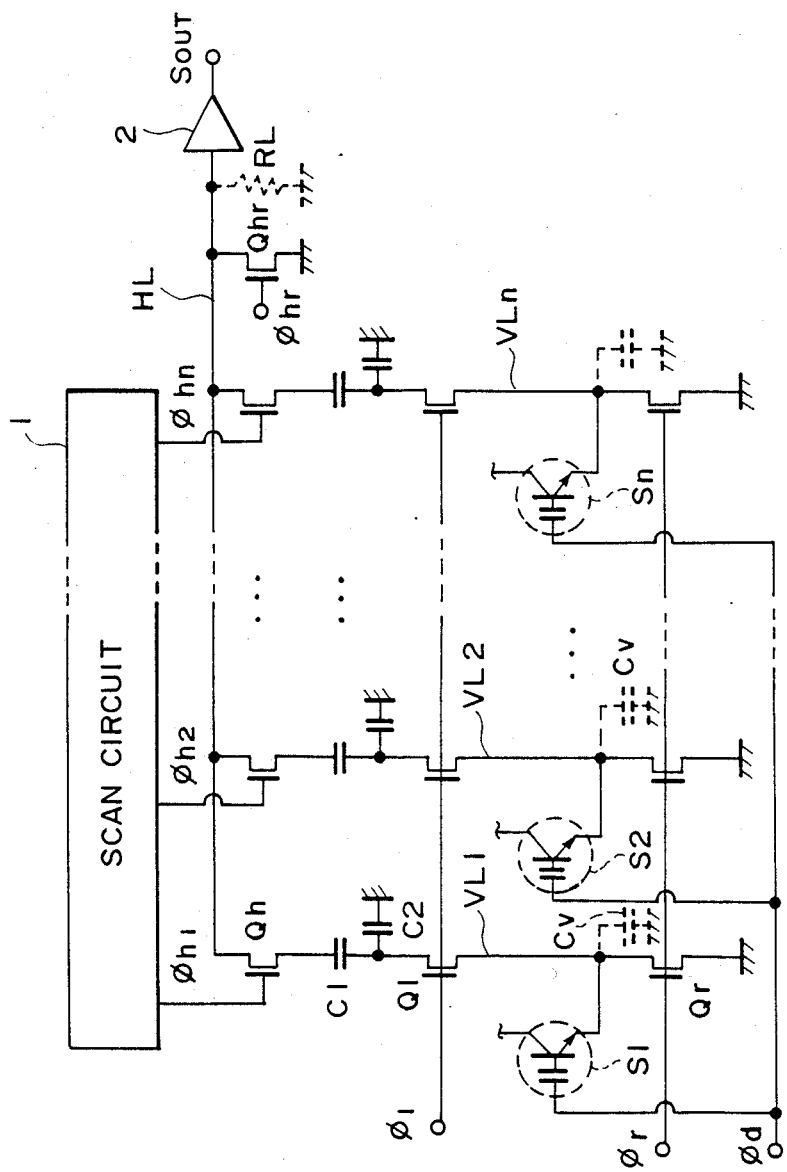
FIG. 10 is a schematic circuit diagram of another embodiment of a solid-state image pickup apparatus according to the invention.

FIG. 10 is a schematic circuit diagram of another example of a solid-state image pickup apparatus using the second embodiment of the invention.

In the diagram, the same parts and components as those in the embodiment shown in FIG. 4 are designated by the same reference numerals.

The embodiment shown in FIG. 10 differs from that shown in FIG. 4 with respect to a point that the transistor $Q_2$ and pulse $\phi_2$ in FIG. 4 are omitted.

The operation of the embodiment having such a construction will now be simply explained with reference to FIG. 11.

Figure 11:
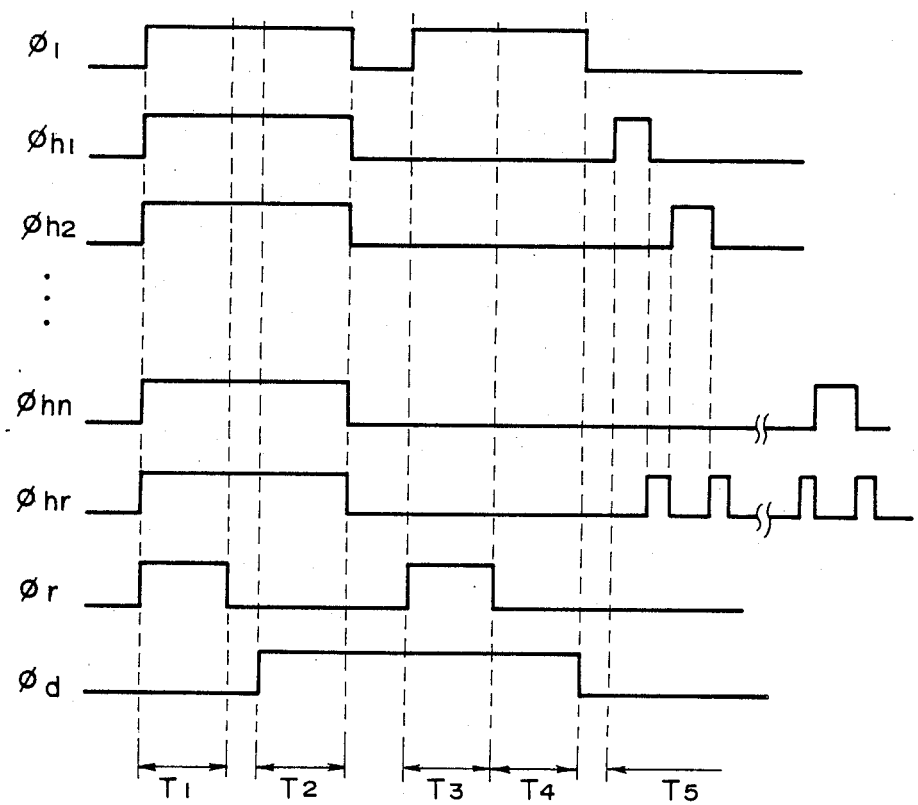
FIG. 11 is a timing chart for explaining the operation of the embodiment shown in FIG. 10.

FIG. 11 is a timing chart for explaining the operation of the embodiment.

As already been described, for a period of time $T_1$, the capacitors $C_1$ and $C_2$ corresponding to the photoelectric converting cells are cleared. For a period of time $T_2$, the readout signals of the cells are accumulated in the capacitors $C_1$ and $C_2$. Then, for a period of time $T_3$, the capacitor $C_2$ is cleared and each of the photoelectric converting cells is refreshed. For a period of time $T_4$, the remaining signal of each cell after it was refreshed is accumulated into each capacitor $C_2$.

After the readout signal and remaining signal of each cell were accumulated, the pulse $\phi_{hl}$ is applied from the scan circuit 1 to the gate electrode of the transistor $Q_h$ for a period of time $T_5$. As mentioned above, the signal in which the remaining signal accumulated in the capacitor $C_2$ was removed from the readout signal of the photoelectric converting cell $S_1$ accumulated in the capacitor $C_1$ is transferred as the information signal onto the output line HL in accordance with the connecting state of the capacitors $C_1$ and $C_2$. This information signal is output through the amplifier 2 to the outside as the output signal $S_{out}$.

After the signal of the cell $S_1$ was output, the transistor $Q_{hr}$ is turned on by the pulse $\phi_{hr}$ and the charges remaining on the output line HL are eliminated.

In a manner similar to the above, the information signals of the photoelectric converting cells $S_2$ to $S_n$ are transferred to the output line HL by the pulses $\phi_{h2}$ to $\phi_{hn}$ and sequentially output as the signals $S_{out}$ through the amplifier 2.

Although the embodiment has been described with respect to the voltage readout system, the invention can be also similarly applied to the case of a current readout system in which the load resistor RL is also connected to the output line HL as shown by the broken line in FIG. 10 as mentioned before in conjunction with FIG. 4.

Although the embodiment has been described with regard to the one-dimensional line sensor, the invention can be also applied to a two-dimensional area sensor.

On the other hand, since the noise components can be removed from the sensor signal by the single vertical line VL, the structure can be simplified and the manufacturing yield is also improved.

Figure 12:
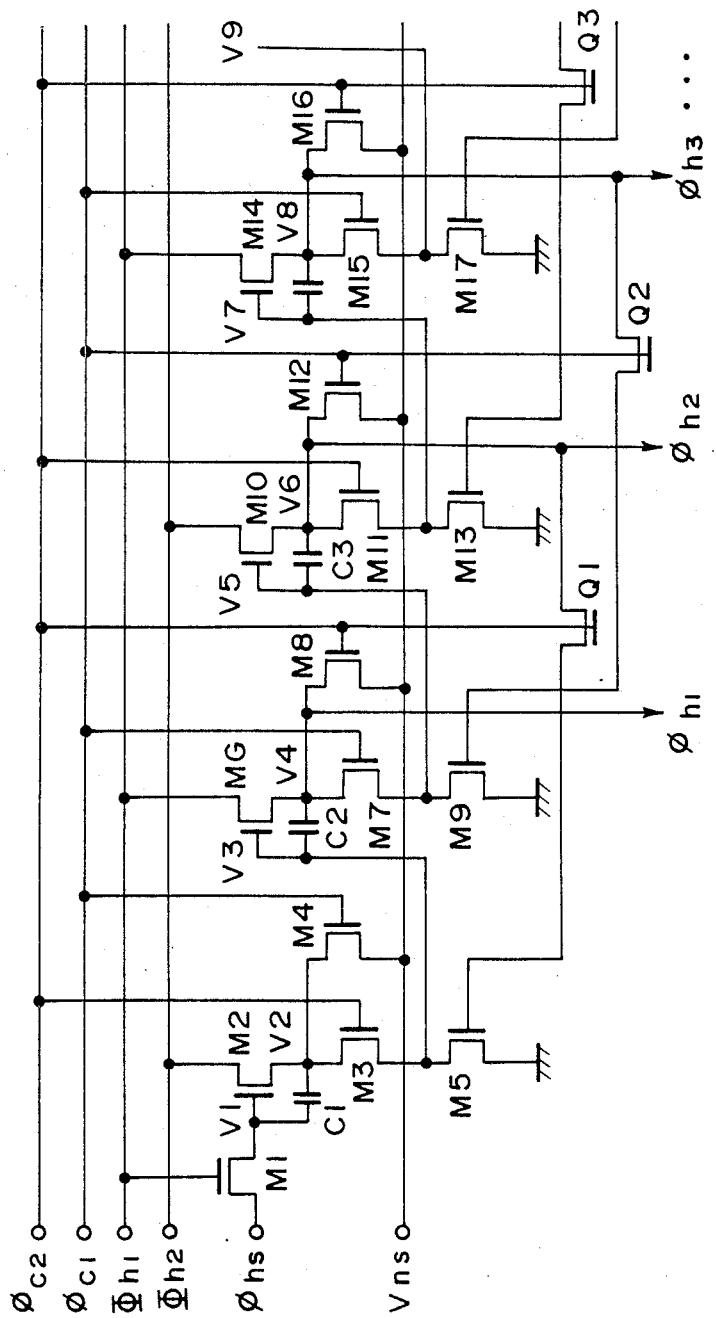
FIG. 12 is a schematic circuit diagram of an example of a scan circuit for use in the invention.

FIG. 12 is a schematic circuit diagram of an example of a scan circuit for use in the embodiment.

In this example, drive pulses $\phi_{c1}$ and $\phi_{c2}$ different from drive pulses $\phi_{h1}$ and $\phi_{h2}$ are input, thereby turning on/off transistors $M_3$, $M_4$, $M_7$, $M_8$, $M_{11}$, $M_{12}$, —.

On the other hand, in the circuit such that an arbitrary scan pulse is returned to a unit circuit which is preceding by two stages and the transistors $M_5$, $M_9$, $M_{13}$, —are turned on, transistors $Q_1$, $Q_2$, —are connected to the respective feedback lines, and the transistors $Q_1$, $Q_2$, —are turned on/off by the drive pulse $\phi_{c1}$ or $\phi_{c2}$.

The operation of this embodiment will now be explained.

Figure 13:
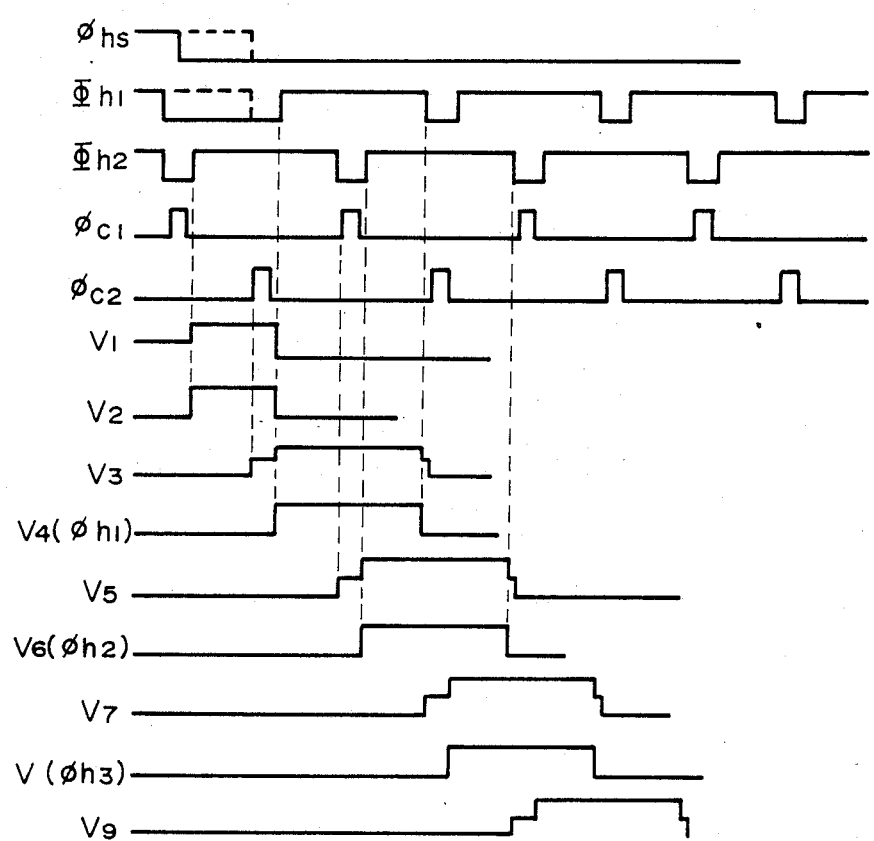
FIG. 13 is a timing chart for explaining the operation of the scan circuit shown in FIG. 12.

FIG. 13 is a timing chart for explaining the operation of this embodiment.

First, in a unit circuit at the front stage, when a start pulse $\phi_{hs}$ is input, the transistor $M_1$ is turned on by the pulse $\phi_{hl}$ and a voltage $V_1$ rises. Since the voltage $V_1$ corresponds to a gate potential of the transistor $M_2$, the transistor $M_2$ indicates a conductance corresponding to the potential $V_1$.

Subsequently, when the pulse $\phi_{hl}$ trails and the pulse $\phi_{h2}$ rises, a voltage $V_2$ increases through the transistor $M_2$. This increased voltage $V_2$ is fed back to a gate of the transistor $M_2$ through the capacitor $C_1$, so that the voltage $V_1$ further rises. Thus, the conductance of the transistor $M_2$ further increases and the pulse $\phi_{h2}$ appears as the voltage $V_2$ without a voltage drop.

In this state, the drive pulse $\phi_{c2}$ of a narrow pulse width is input. Thus, the transistor $M_3$ is turned on and a voltage $V_3$ of the unit circuit at the first stage is raised.

Subsequently, the drive pulse $\phi_{h1}$ of a wide pulse width is set to the high level, thereby increasing a voltage $V_4$ through the transistor $M_6$ and further raising the voltage $V_3$ through the capacitor $C_2$. Thus, the pulse $\phi_{h1}$ directly appears as the voltage $V_4$ and is output as the scan pulse $\phi_{h1}$.

At the same time, the transistor $M_1$ is turned on by the pulse $\phi_{h1}$ and the potential $V_1$ decreases to a reference potential.

When the voltage $V_4$ is held at the high level, the drive pulse $\phi_{cl}$ of a narrow pulse width rises, the transistor $M_7$ in the unit circuit at the first stage is turned on, and a voltage $V_5$ of the unit circuit at the second stage rises.

When the drive pulse $\phi_{h2}$ rises, a voltage $V_6$ increases by the transistor $M_{10}$ and capacitor $C_3$ and is output as a scan pulse $\phi_{h2}$. At this time point, since the transistor $Q_1$ connected to the feedback line is in the OFF state, the transistor $M_5$ is held in the OFF state. Thus, the voltage $V_3$ at the first stage is also at the high level and the scan pulse $\phi_{h1}$ is also held at the high level.

Subsequently, when the drive pulse $\phi_{h1}$ trails, the voltage $V_4$ scan pulse $\phi_{h1}$) trails and the voltage $V_3$ also decreases.

Next, when the drive pulse $\phi_{c2}$ rises, the transistor $M_{11}$ is turned on to raise a voltage $V_7$ and at the same time, the transistors $M_8$, $Q_1$, and $M_3$ are turned on.

When the transistor $M_8$ is turned on, the voltage $V_4$ is reset to a reference potential $V_{rs}$.

When the transistor $Q_1$ is turned on, the transistor $M_5$ is turned on by the scan pulse $\phi_{h2}$ and the voltage $V_3$ is set to the earth potential. Further, since the transistor $M_3$ is turned on, the voltage $V_2$ is also reset to the earth potential.

In this manner, as shown in FIG. 8, the scan pulses $\phi_{h1}$, $\phi_{h2}$, $\phi_{h3}$, —are overlappingly successively output at the timings of the drive pulses $\phi_{h1}$ and $\phi_{h2}$. That is, a scan pulse output of a wide pulse width of a duty ratio of 50 % or more can be derived.

Figure 14A:
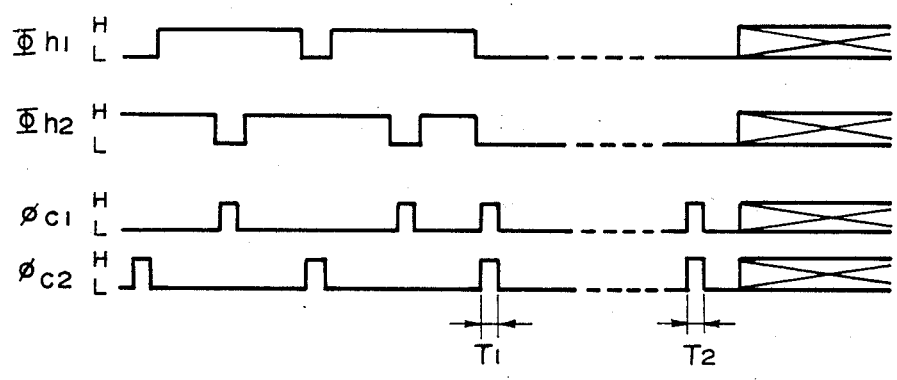
FIG. 14A is a timing chart for explaining the lump resetting operation in this example.
Figure 14B:
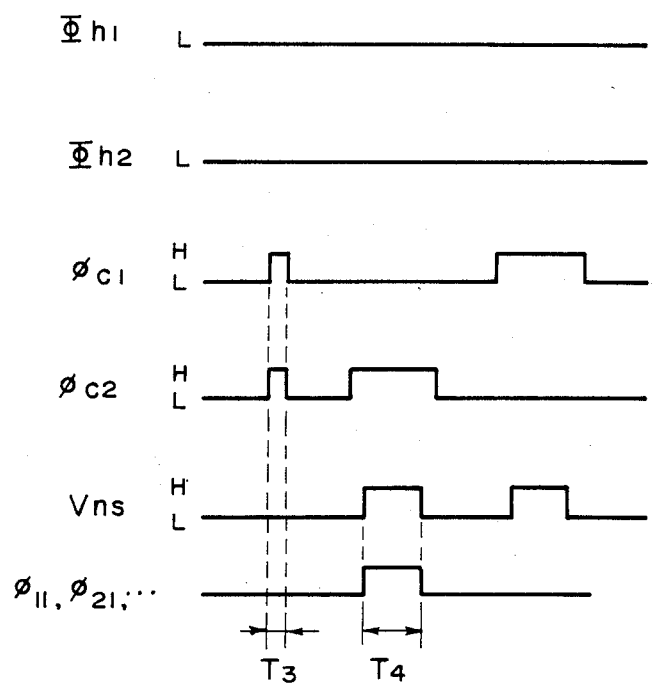
FIG. 14B is a timing chart for explaining the lump high-level setting operation.

FIG. 14A is a timing chart for explaining the lump resetting operation in the embodiment. FIG. 14B is a timing chart for explaining the lump high-level setting operation in the embodiment.

As shown in FIG. 14A, the lump resetting operation is executed by simultaneously setting the drive pulses $\phi_{c1}$ and $\phi_{c2}$ to the high level in the state in which the reference voltage $V_{rs}$ is held at the low level. In the case of the period $T_1$, the lump resetting operation is executed while the scan pulse is being output. In the case of the period $T_2$, the lump resetting operation is performed at the start of the scan.

Such a lump resetting function is useful for an enlargement reading operation in an image pickup apparatus, which will be explained hereinlater.

As shown in FIG. 14B, the lump high-level setting operation is executed by setting the drive pulses $\phi_{c1}$ and $\phi_{c2}$ to the high level in the state in which the reference voltage $V_{ns}$ is set to the high level. In the case of the period $T_4$, by setting the pulse $\phi_{c2}$ to the high level, the transistors $M_8$, $M_{16}$, —are turned on and the scan pulses $\phi_{h1}$, $\phi_{h3}$, —, $\phi_{h(2n+1)}$ are set to the high level. In the case of the period $T_5$, the scan pulses $\phi_{h2}$, $\phi_{h4}$, —, $\phi_{h2n}$ are set to the high level.

The period of time $T_3$ shows the case of the foregoing lump resetting operation.

Figure 15:
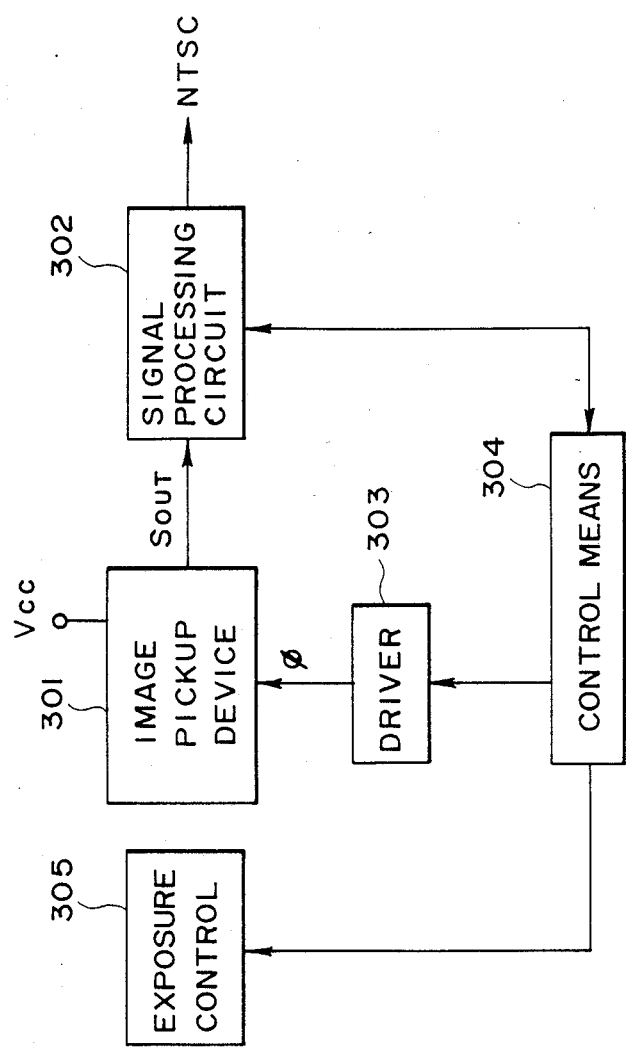
FIG. 15 is a schematic arrangement diagram of an example of an image pickup system using a two-dimensional image pickup apparatus.

FIG. 15 shows a schematic arrangement diagram of an example of an image pickup system using a two-dimensional image pickup apparatus.

In the diagram, an image pickup device 301 corresponds to a two-dimensional apparatus of the apparatus shown in FIG. 10. The output signal $S_{out}$ of the image pickup device 301 is subjected to processes such as a gain control and the like by a signal processing circuit 302 and is output as a standard television signal such as an NTSC signal or the like.

On the other hand, each of the pulses to drive the image pickup device 301 is supplied by a driver 303. The operation of the driver 303 is controlled by control means 304. The control means 304 adjusts the gain or the like of the signal processing circuit 302 on the basis of an output of the image pickup device 301 and also controls exposure control means 305, thereby adjusting an amount of incident light to the image pickup device 301.

What is claimed is:

1. A photoelectric converting apparatus having accumulating means for accumulating a signal from a photoelectric converting device, comprising:

first accumulating means for accumulating a photoelectrically converted signal readout from the photoelectric converting device;

second accumulating means for accumulating a signal remaining in the photoelectric converting device after refreshing of the photoelectric converting device; and control means for outputting on one output line an output signal in which the remaining signal is removed from the photoelectrically converted signal, by simultaneously reading out the signals accumulated in said first and second accumulating means to said one output line to superpose the signals on said one output line.

2. An apparatus according to claim 1, wherein said first and second accumulating means include capacitors.

3. An apparatus according to claim 1, wherein said control means obtains the output signal in a state in which said first and second accumulating means are serially connected.

4. An apparatus according to claim 1, wherein said photoelectric converting device can perform a nondestructive readout operation.

5. A photoelectric converting apparatus comprising:
(a) a photoelectric converting device for generating a charge signal corresponding to an amount of incident light;
(b) first accumulating means for reading out and accumulating a signal photoelectrically converted by said photoelectric converting device and including a noise signal;
(c) second accumulating means for reading out and accumulating the noise signal of the photoelectric converting device; and
(d) output means for outputting on one output line an output signal in which the noise signal is removed from the photoelectrically converted signal, by mixing the signals accumulating in said first and second accumulating means on said one output line.

6. An apparatus according to claim 5, wherein said first and second accumulating means include capacitors.

7. A photoelectric converting apparatus comprising:
(a) a photoelectric converting device for generating a charge signal corresponding to an amount of incident light;
(b) first accumulating means for reading out and accumulating a signal photoelectrically converted by said photoelectric converting device and including a noise signal; and
(c) second accumulating means for reading out and accumulating the noise signal of the photoelectric converting device;
(d) wherein said output means mixes the signals of said first and second accumulating means in a state in which the first and second accumulating means are serially connected and then reads out a resultant mixed signal.

8. An apparatus according to claim 7, further including refreshing means for refreshing the photoelectric converting device after the photoelectrically converted signal including the noise signal is read out of the photoelectric converting device.

9. An apparatus according to claim 8, wherein said second accumulating means reads out and accumulates the noise signal of said photoelectric converting device just after the photoelectric converting device is refreshed by said refreshing means.

10. A photoelectric converting apparatus comprising:
(a) a photoelectric converting device for generating a charge signal corresponding to an amount of incident light;
(b) first accumulating means for reading out and accumulating a signal photoelectrically converted by said photoelectric converting device and including a noise signal; and
(c) second accumulating means for reading out and accumulating the noise signal of the photoelectric converting device;
wherein said photoelectric converting device can nondestructively read out the charge signal corresponding to the amount of incident light.

11. A photoelectric converting apparatus in which first reset means and first and second accumulating means are connected to an output terminal of a photoelectric converting device, signal transfer means and second reset means are further connected to said output terminal through said second accumulating means, the second accumulating means is set to a reference potential by said second reset means when a first signal is read out of the photoelectric converting device, and the second accumulating means is set into a floating state by the second reset means when a second signal is read out of the photoelectric converting device.

12. An apparatus according to claim 11, wherein said signal transfer means has third accumulating means and a signal which is obtained by superposing the first and second signals accumulated in said first and second accumulating means is accumulated into said third accumulating means.

13. A photoelectric converting apparatus having accumulating means for accumulating a signal from a photoelectric converting device, comprising:
first accumulating means for accumulating a readout signal from the photoelectric converting device;
second accumulating means for accumulating a remaining signal after the photoelectric converting device is refreshed; and
control means for mixing the signals of said first and second accumulating means on one output line.

14. An apparatus according to claim 13, wherein said first and second accumulating means include capacitors.

15. An apparatus according to claim 13, wherein said control means obtains an output signal in a state in which said first and second accumulating means are serially connected.

16. An apparatus according to claim 13, wherein said photoelectric converting device can perform a nondestructive readout operation.

* * * * *

UNITED STATES PATENT AND TRADEMARK OFFICE
CERTIFICATE OF CORRECTION

PATENT NO. : 4,910,597
DATED : March 20, 1990
INVENTOR(S) : Harada, et al.

It is certified that error appears in the above-identified patent and that said Letters Patent is hereby corrected as shown below:

COLUMN 1:

Line 58, "there for." should read --therefor.--.

COLUMN 2:

Line 45, "claim" should read --claims--.

COLUMN 3:

Line 4, "inventions;" should read --invention;--.

Line 59, "$T_1$)" should read --$T_1$).--

COLUMN 5:

Line 23, "vertical lines $VL_1$ to $VL_n$," should read
--vertical lines $VL_1$ to $VL_n$.--.

COLUMN 7:

Line 7, "to" should read --in--.

Line 10, "tors $Q_h$ and $O_{hr}$" should read
--tors $Q_h$ and $Q_{hr}$--.

UNITED STATES PATENT AND TRADEMARK OFFICE
CERTIFICATE OF CORRECTION

PATENT NO. : 4,910,597
DATED : March 20, 1990
INVENTOR(S) : Harada, et al.

It is certified that error appears in the above-identified patent and that said Letters Patent is hereby corrected as shown below:

COLUMN 8:

Line 22, "As already" should read --As has already--.

COLUMN 9:

Line 53, "scan pulse $\phi_{h1}$)" should read

--(scan pulse $\phi_{h1}$)--.

Signed and Sealed this

Tenth Day of September, 1991

Attest:

HARRY F. MANBECK, JR.

*Attesting Officer*   *Commissioner of Patents and Trademarks*